Figure 1:
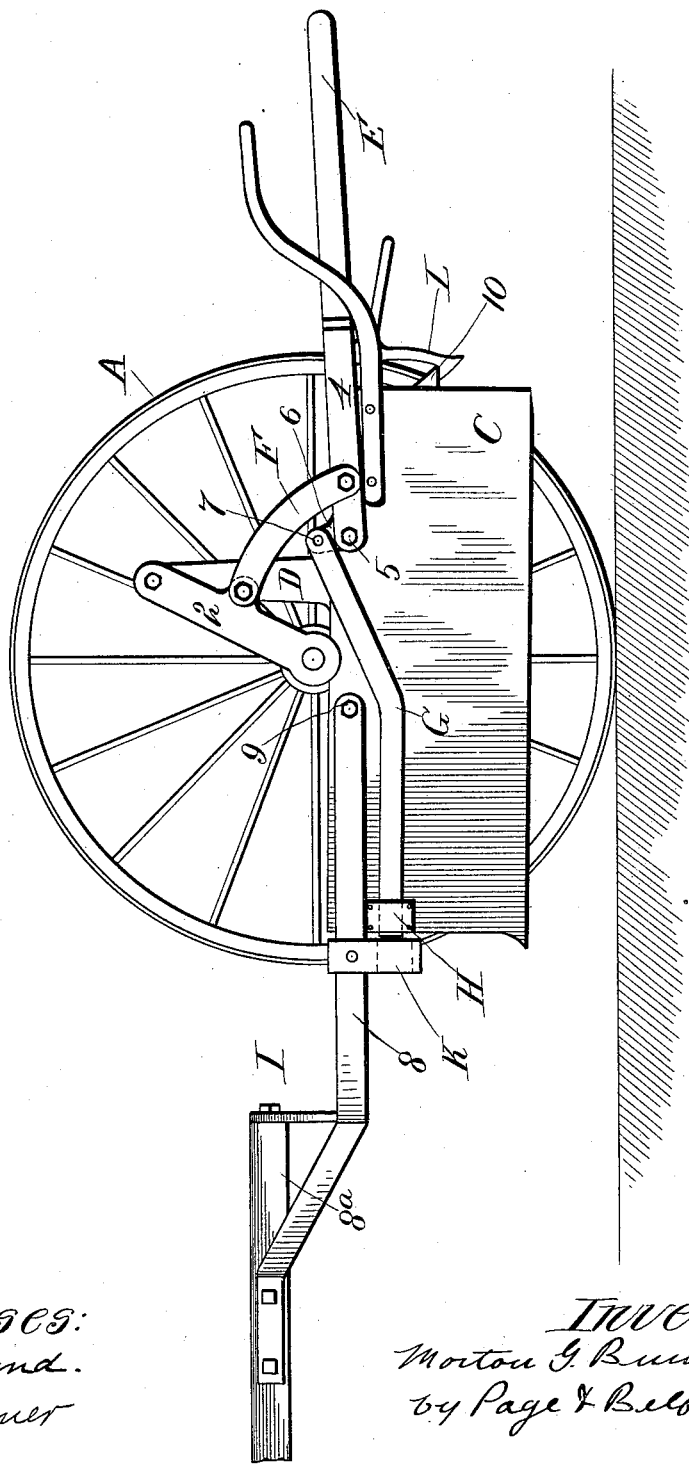

(No Model.)
2 Sheets—Sheet 1.

M. G. BUNNELL.
DUMPING SCRAPER.

No. 591,378.  Patented Oct. 12, 1897.

Witnesses:
A. F. Durand.
Reta M. Wagner

Inventor:
Morton G. Bunnell
by Page & Belfield
attys.

(No Model.) 2 Sheets—Sheet 2.
M. G. BUNNELL.
DUMPING SCRAPER.
No. 591,378. Patented Oct. 12, 1897.
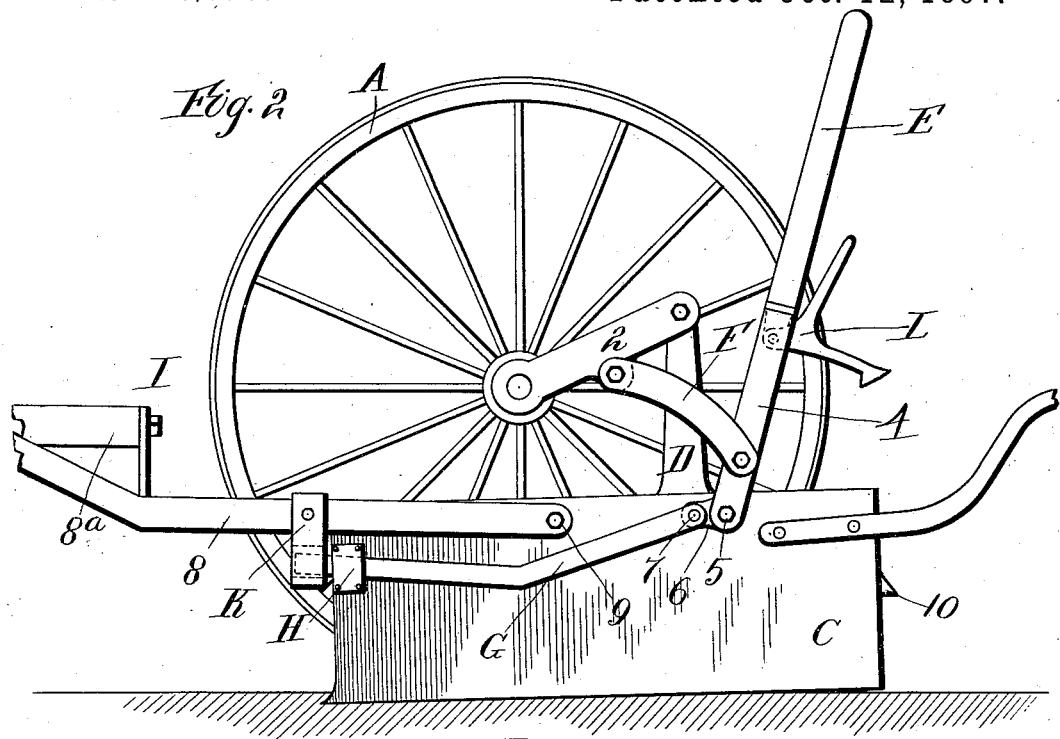
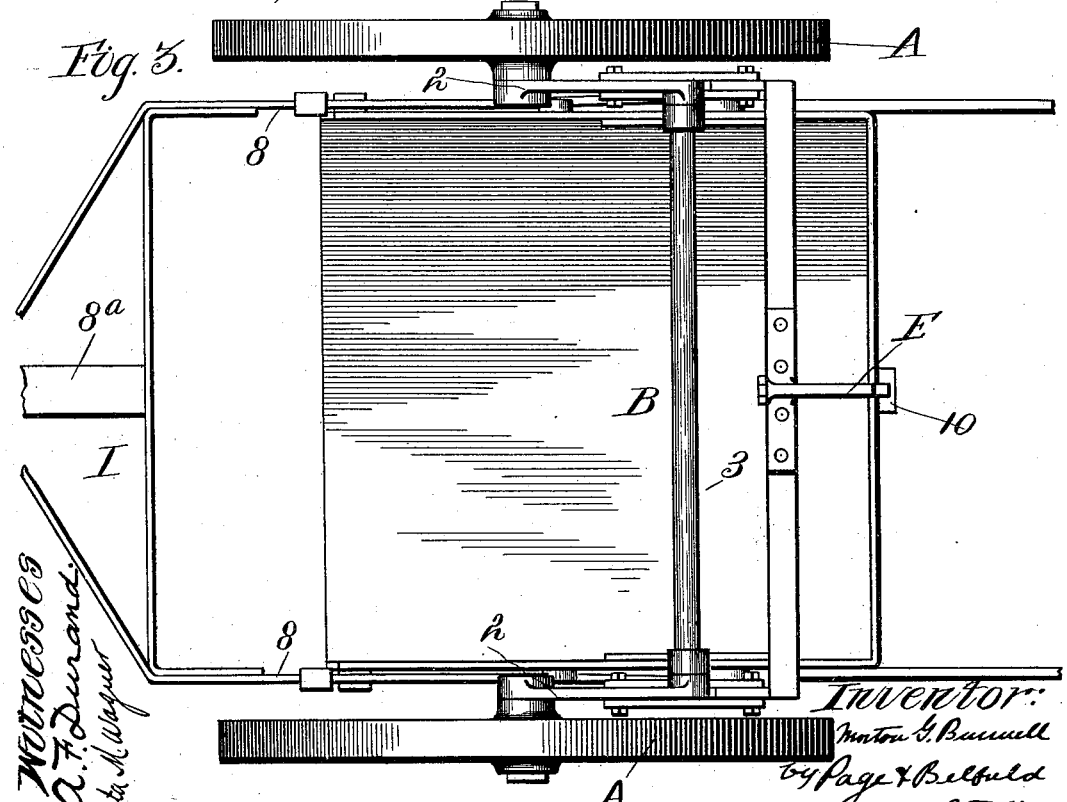
Witnesses
A. F. Durand
Peter N. Wagner
Inventor:
Morton G. Bunnell
by Page & Belfield
attys.
THE NORRIS PETERS CO., PHOTO-LITHO., WASHINGTON, D. C.

UNITED STATES PATENT OFFICE.

MORTON G. BUNNELL, OF CHICAGO, ILLINOIS, ASSIGNOR TO FREDERICK C. AUSTIN, OF SAME PLACE.

DUMPING-SCRAPER.

SPECIFICATION forming part of Letters Patent No. 591,378, dated October 12, 1897.

Application filed February 20, 1897. Serial No. 624,405. (No model.)

*To all whom it may concern:*

Be it known that I, MORTON G. BUNNELL, a citizen of the United States, residing at Chicago, in the county of Cook and State of Illinois, have invented a certain new and useful Improvement in Dumping-Scrapers, of which the following is a specification.

My invention relates to a construction of wheeled dumping-scrapers in which the bowl or scoop is suspended from the high portion of a crank-axle and the draft attachment and raising and lowering lever or levers pivoted to the scoop.

The object of my invention is to provide simple and efficient means for holding down and positively locking the scoop in working position—that is to say, in position for scooping up the soil—and to operate the locking device for such purpose in a convenient and reliable way.

In a wheeled dumping-scraper characterized by my invention the scoop is suspended from the high portion of a crank-axle, the draft attachment and raising and lowering lever are pivoted to the scoop, and a bolt having a hinge connection with and operated by the raising and lowering lever is arranged for forward and rear end thrust, according to the direction in which the raising and lowering lever is swung. A guide or keeper is also provided upon the scoop for supporting and guiding the forward free end portion of the bolt, which latter slides within said keeper when the raising and lowering lever is operated. A catch or keeper is also arranged upon the draft attachment and engaged by the bolt when the lever is raised and the scoop lowered into working position as a result of such movement on the part of the lever.

In the accompanying drawings, Figure 1 is a side elevation of a wheeled dumping-scraper embodying my invention, the scoop being raised to a carrying position. Fig. 2 is a like view showing the scoop lowered to a working position and locked to the draft attachment. Fig. 3 is a top plan view of the wheeled dumping-scraper.

The wheels A A are arranged upon the journal or spindle portions of a crank-axle B, which comprises a couple of crank-arms or crank portions 2 2, arranged upon or provided with said spindles and connected together by a cross rod or bar 3, the whole forming what is commonly known as a "crank" or "cranked axle." The scoop C is suspended by hangers D from the high portion of the crank-axle, (either from the cross-bar 3 or upper end portions of the arms 2,) whereby it will be raised and lowered by a crank-movement.

The raising and lowering levers consist of the arms 4 of a swinging yoke or bail E, arranged to straddle the scoop and having its said arms pivoted respectively to opposite sides of the scoop in rear of the spindle portions of the crank-axle. The raising and lowering levers 4 are respectively connected with one and the other of the arms 2 by connections F, which preferably consist of links having pivotal connections with the levers and arms. At one and preferably at each side of the scoop is a long bolt G, having a hinge connection with the lever 4 at the side of the scoop whereon it is arranged. As a simple and desirable arrangement, the lever 4 can be provided at a point near pivot 5, by which it is attached to the scoop, with a short projection or lug 6, to which the bolt is attached by a pivot 7, as in Figs. 1 and 2, it being understood that the same arrangement is also desirably provided at the opposite side of the machine, or the end of the bolt can be suitably bent and pivoted directly to the lever 4. The bolt G extends forwardly from its hinged connection with the lever and passes through a guide or keeper H, arranged on the side of the scoop at a point near the forward end thereof, whereby the bolt will be both guided and supported at its forward end portion, it being observed that by connecting the bolt with the raising and lowering lever near the point at which the latter is pivoted to the scoop the rear portion of the bolt will have only a very limited extent of up-and-down motion during its forward and rear end movements, and that the motion of its forward end portion will be very nearly that of a straight reciprocating movement. Thus when the lever 4 is swung about its pivot 5 the pivot 7, by which the rear end of the bolt G is attached to said arm, will be moved in the arc of a comparatively small circle, whereby the up-and-down movement of such rear end of the bolt will be comparatively slight, and any up-and-down vibratory play of its end portion beyond the bearing or keeper H will of course be very slight.

The draft attachment I has its side arms or hounds 8 bent downwardly from the pole 8ª and respectively pivoted to opposite sides of the scoop, as at 9, and where the foregoing-described arrangement of bolt G and keeper H is provided at either or both sides of the machine, as is desirably the case, one or each hound or side portion 8 of the draft attachment, as the case may be, is provided with a catch or keeper K in position to receive or be engaged by one of the bolts when the latter is thrust forward from its guide or keeper K on the scoop. The arrangement of bolts and keepers is such that when the lever E is raised from the carrying position shown in Fig. 1 and the scoop thereby lowered into the working position shown in Fig. 2 the bolts will slide forwardly through the guides or keepers H and engage in the keepers K with a locking engagement at a moment suitable for positively locking together the scoop and the draft attachment, as in Fig. 1. By such arrangement the scoop while in working position will be held against both up and down tilt. So long, therefore, as the bail or raising and lowering lever is raised, as in Fig. 2, the scoop and draft attachment will be locked together and the former locked in working position. Upon swinging rearwardly and downwardly the raising and lowering lever, however, the bolts will be drawn backward and clear from the catches or keepers on the draft attachment, so that when necessary the scoop can be dumped, it being observed that it can be temporarily held in proper carrying position by a latch L, arranged upon the bail and adapted to engage a catch 10 on the rear end of the scoop.

The guide H can be conveniently formed by a bent metal strap riveted at its ends to the scoop. When arranged as illustrated, it can also serve as a stop which will abut against the draft attachment when the bowl is raised into carrying position, as in Fig. 1, and thereby prevent any rear tilt on the part of the bowl. Stops have been provided for preventing such rear tilt on the part of the bowl in wheeled dumping-scrapers, but by my invention I provide a device which serves not only as a stop, but also as a guide or keeper for a sliding bolt.

What I claim as my invention is—

1. A wheeled dumping-scraper comprising the bowl and a crank-movement by which it is raised and lowered; a draft attachment and a raising and lowering lever adapted for operating the crank-movement, both pivoted to the bowl; a longitudinally-reciprocating bolt having a hinge connection with and extending forward from the raising and lowering lever; a guide upon the bowl for the bolt; and a catch or keeper which is arranged upon the draft attachment and engaged by the bolt when the bowl is lowered into working position by the raising and lowering lever and the bolt thrust forward by the upward swing of said lever.

2. The combination in a wheeled dumping-scraper, of the bowl arranged to be raised and lowered; a draft attachment and a raising and lowering lever both pivoted upon the bowl; a bolt pivoted to the raising and lowering lever adjacent to the pivot for the latter; a guide H through which the bolt is extended, arranged upon the scoop at the forward portion thereof; and a keeper K arranged upon the draft attachment and in position to receive the forward end of the bolt when the lever is raised and the bowl lowered into working position.

3. In a dumping wheeled scraper, the scoop and mechanism for raising and lowering the same; a bolt G operated by the raising and lowering mechanism and arranged to engage with a catch or keeper on a draft attachment having hinged connection with the bowl; and a guide or keeper for the bolt arranged on the bowl and positioned to engage the draft attachment as a stop when the bowl is in raised, carrying position, substantially as described.

MORTON G. BUNNELL.

Witnesses:
A. F. DURAND,
RETA M. WAGNER.